United States Patent
Yang et al.

(10) Patent No.: US 12,395,956 B2
(45) Date of Patent: Aug. 19, 2025

(54) TIMING ADVANCE ADJUSTMENT SCHEMES IN WIRELESS COMMUNICATION

(71) Applicant: ZTE Corporation, Guangdong (CN)

(72) Inventors: Zhen Yang, Guangdong (CN); Nan Zhang, Guangdong (CN); Wei Cao, Guangdong (CN); Kaibo Tian, Guangdong (CN)

(73) Assignee: ZTE Corporation, Shenzhen (CN)

( * ) Notice: Subject to any disclaimer, the term of this patent is extended or adjusted under 35 U.S.C. 154(b) by 67 days.

(21) Appl. No.: 17/369,805

(22) Filed: Jul. 7, 2021

(65) Prior Publication Data
US 2021/0345281 A1 Nov. 4, 2021

Related U.S. Application Data

(63) Continuation of application No. PCT/CN2019/071461, filed on Jan. 11, 2019.

(51) Int. Cl.
*H04W 56/00* (2009.01)

(52) U.S. Cl.
CPC ............... *H04W 56/0045* (2013.01)

(58) Field of Classification Search
None
See application file for complete search history.

(56) References Cited

U.S. PATENT DOCUMENTS

| | | | |
|---|---|---|---|
| 9,503,994 B2 | 11/2016 | Bergstrom et al. | |
| 2012/0115539 A1 | 5/2012 | Zhang et al. | |
| 2013/0188582 A1* | 7/2013 | Dinan | H04W 72/21 370/329 |
| 2013/0188620 A1 | 7/2013 | Dinan | |
| 2013/0272231 A1 | 10/2013 | Dinan | |
| 2014/0133430 A1 | 5/2014 | Yang et al. | |
| 2015/0146635 A1* | 5/2015 | Filipovich | H04W 74/0833 370/329 |
| 2016/0088577 A1 | 3/2016 | Cui et al. | |
| 2016/0100432 A1 | 4/2016 | Dinan | |
| 2017/0280471 A1* | 9/2017 | Lee | H04W 72/20 |
| 2018/0124724 A1 | 5/2018 | Tsai et al. | |
| 2019/0159156 A1* | 5/2019 | Abedini | H04W 56/0005 |
| 2019/0182692 A1 | 6/2019 | Park et al. | |

(Continued)

FOREIGN PATENT DOCUMENTS

| | | |
|---|---|---|
| CN | 101154984 A | 4/2008 |
| CN | 101841778 A | 9/2010 |

(Continued)

OTHER PUBLICATIONS

Samsung, "Timing reference for sTAG," 3GPP TSG-RAN WG2#77bis meeting, R2-121712, Jeju, Korea, Mar. 26-30, 2012, 3 pages.

(Continued)

*Primary Examiner* — Saad Khawar
(74) *Attorney, Agent, or Firm* — Perkins Coie, LLP

(57) ABSTRACT

Methods, systems, and devices for TA adjustment schemes in a wireless communication are described. A wireless communication method is provided to include transmitting, by a network device, to a user device, a timing advance (TA) signaling including one or more TA adjustment parameters, the one or more TA adjustment parameters determined partially depending on the group of the user device.

16 Claims, 7 Drawing Sheets

(56) References Cited

U.S. PATENT DOCUMENTS

| | | | | |
|---|---|---|---|---|
| 2019/0223178 | A1* | 7/2019 | Bergström | H04W 72/0446 |
| 2020/0245354 | A1* | 7/2020 | Kazmi | H04W 76/15 |
| 2021/0160805 | A1* | 5/2021 | Xu | H04W 56/0015 |
| 2021/0328659 | A1* | 10/2021 | Luo | H04B 7/18513 |

FOREIGN PATENT DOCUMENTS

| | | |
|---|---|---|
| CN | 102932947 A | 2/2013 |
| CN | 103491622 A | 1/2014 |
| CN | 104094548 A | 10/2014 |
| CN | 107787039 A | 3/2018 |
| KR | 20110081086 A | 7/2011 |
| KR | 20140038480 A | 3/2014 |
| KR | 20160013159 A | 2/2016 |
| KR | 20180048382 A | 5/2018 |
| WO | 2013024346 A1 | 2/2013 |
| WO | 2013112952 A1 | 8/2013 |

OTHER PUBLICATIONS

European Search Report for EP Patent Application No. 19849829.7, dated Dec. 10, 2021, 11 pages.
International Search Report and Written Opinion mailed on Aug. 28, 2019 for International Application No. PCT/CN2019/071461, filed on Jan. 11, 2019 (6 pages).
KIPO, Office Action for Korean Application No. 10-2021-7025068, mailed on Jan. 30, 2023, 4 pages with unofficial translation.
KIPO, Office Action for Korean Application No. 10-2021-7025068, mailed on Jul. 24, 2023, 5 pages with unofficial translation.
KIPO, Notice of Allowance for Korean Application No. 10-2021-7025068, mailed on Jan. 4, 2024, 9 pages with unofficial English translation.

* cited by examiner

Transmitting, by a network device, to a user device, a TA signaling including one or more TA adjustment parameters

FIG. 5

TIMING ADVANCE ADJUSTMENT SCHEMES IN WIRELESS COMMUNICATION

CROSS-REFERENCE TO RELATED APPLICATIONS

This application is a continuation of International Patent Application No. PCT/CN2019/071461, filed on Jan. 11, 2019, the contents of which are incorporated herein by reference in their entirety.

TECHNICAL FIELD

This patent document generally relates to systems, devices, and techniques for wireless communications.

BACKGROUND

Wireless communication technologies are moving the world toward an increasingly connected and networked society. The rapid growth of wireless communications and advances in technology has led to greater demand for capacity and connectivity. Other aspects, such as energy consumption, device cost, spectral efficiency, and latency are also important to meeting the needs of various communication scenarios. In comparison with the existing wireless networks, next generation systems and wireless communication techniques need to provide support for an increased number of users and devices.

SUMMARY

This document relates to methods, systems, and devices for adjusting timing advance (TA) in wireless communication. Some implementations of the disclosed technology provide TA adjustment schemes with an improved flexibility, thereby meeting the need for more various communication scenarios and reducing signaling overhead.

In one aspect, a wireless communication method is provided to include: transmitting, by a network device, to a user device, a timing advance (TA) signaling including one or more TA adjustment parameters, the one or more TA adjustment parameters determined partially depending on a group of the user device.

In another aspect, a wireless communication method is provided to include: receiving, by a user device, from a network device, at least one of i) a group information indicating a group assigned to the user device; or ii) one or more TA adjustment parameters included in a timing advance (TA) signaling; and determining, by the user device, a TA value for an uplink transmission based on the receiving.

In another aspect, a wireless communication apparatus comprising a processor configured to perform the disclosed methods is disclosed.

In another aspect, a computer readable medium having code stored thereon is disclosed. The code, when implemented by a processor, causes the processor to implement a method described in the present document.

The above and other aspects and their implementations are described in greater detail in the drawings, the descriptions, and the claims.

BRIEF DESCRIPTION OF THE DRAWINGS

FIG. 5 shows an example of a TA adjustment scheme based on some implementations of the disclosed technology.

DETAILED DESCRIPTION

Figure 1:
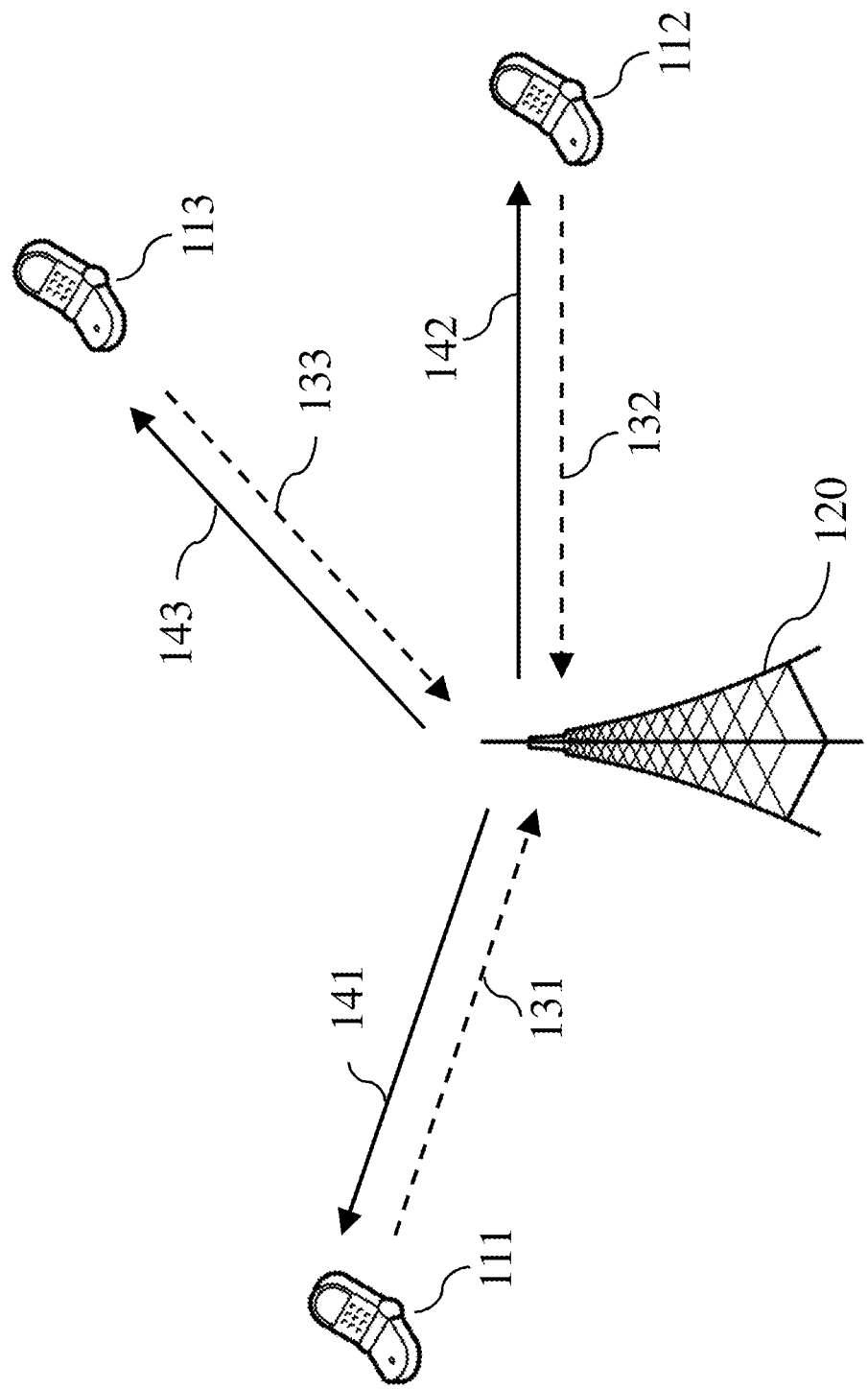
FIG. 1 shows an example of a base station (BS) and user equipment (UE) in wireless communication based on some implementations of the disclosed technology.

Section headings are used in the present document only to facilitate ease of understanding and scope of the embodiments and techniques described in each section are not only limited to that section. Furthermore, while 5G terminology is used in some cases to facilitate understanding of the disclosed techniques, which may be applied to wireless systems and devices that use communication protocols other than 5G or 3GPP protocols.

The disclosed technology may be used by implementations to provide techniques to adjust timing advance (TA). Some implementations of the disclosed technology provide TA adjustment schemes with an improved flexibility to supports more various applications. Some implementations of the disclosed technology can effective reduce signaling overhead.

In an OFDM (Orthogonal Frequency-Division Multiplexing) system, the synchronization error of the uplink signal needs to be smaller than the length of the CP (Cyclic Prefix) to ensure the orthogonality between the subcarriers. If the synchronization error of the uplink signal is not smaller than the length of the CP, the orthogonality between the subcarriers will be destroyed, causing inter-carrier interference. In this case, the system performance is greatly affected. In the LTE (Long Term Evolution) and NR (New Radio Access Technology) systems, to ensure that the uplink synchronization error maintains within the range that the system can tolerate, a Timing Advance (TA) adjustment mechanism is adopted. According to the TA adjustment mechanism, a network station such as a base station BS continuously monitors the change of the uplink synchronization error of a user device UE. After the synchronization error reaches a certain threshold, the BS sends the UE-specific TA adjustment signaling to the UE through the MAC CE (MAC layer control unit), and the UE increases or decreases its own uplink timing advance based on the signaling such that the change in synchronization error does not become beyond the protection range of the CP. The TA adjustment mechanism can effectively maintain the uplink synchronization state of the UE and ensure that the UE does not exceed the protection range of the CP.

For the current terrestrial network, the existing TA adjustment mechanism might be enough to meet the demands. For some possible scenarios expected in future, however, the existing TA mechanism has the defect of high signaling overheads. For example, for low-orbit satellite communications systems using LTE or NR technology, the distance between the ground UE and the satellite changes rapidly as the satellite moves around the Earth at high speed (faster than 7 km/s). This rapid change in distance eventually leads to a rapid change in the uplink synchronization error of the UE, which is much higher than that of the terrestrial network. In addition, considering that the number of UE in the satellite cell is much greater than that of the ground cell, the TA adjustment demand in the low-orbit satellite network is far higher than the ground network. If the existing TA adjustment mechanism is adopted to the low-orbit satellite network without any changes, it will inevitably lead to high signaling overheads. For example, MMTC (Massive Machine Type Communications) or NB-IoT (Narrowband-Internet of Things) application scenarios, there are a great number of static or quasi-static IoT devices in the small area. In these scenarios, the uplink synchronization error is mainly caused by the clock drift of the BS and the UE. Although the rate of synchronous error change caused by clock drift is much lower than that of low-orbit satellite system, the use of existing TA adjustment mechanism will still lead to high signaling overhead due to the huge number of UE.

Upon recognition of the limitations of the existing TA adjustment mechanism, the disclosed technology provides various implementations of the TA adjustment mechanism. The various implementations can be carried out at a network-side device or a user device.

FIG. 1 shows an example of a wireless communication system (e.g., a 5G or NR cellular network) that includes a BS 120 and one or more user equipment (UE) 111, 112 and 113. In some embodiments, the UEs access the BS (e.g., the network) using implementations of the disclosed technology (131, 132, 133), which then enables subsequent communication (141, 142, 143) from the BS to the UEs. The UE may be, for example, a smartphone, a tablet, a mobile computer, a machine to machine (M2M) device, an Internet of Things (IoT) device, and so on.

Figure 2:
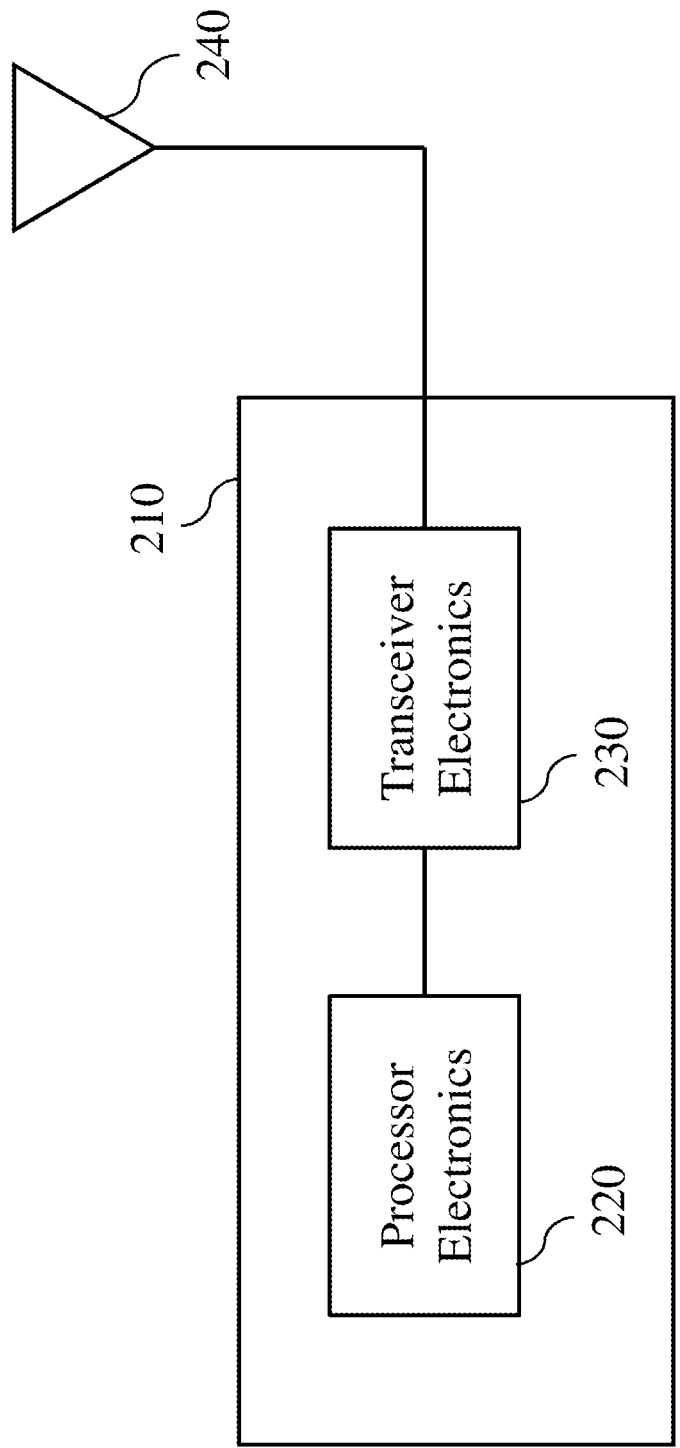
FIG. 2 shows an example of a block diagram of a portion of an apparatus based on some implementations of the disclosed technology.

FIG. 2 shows an example of a block diagram representation of a portion of an apparatus. An apparatus 210 such as a base station or a wireless device (or UE) can include processor electronics 220 such as a microprocessor that implements one or more of the techniques presented in this document. The apparatus 210 can include transceiver electronics 230 to send and/or receive wireless signals over one or more communication interfaces such as antenna 240. The apparatus 210 can include other communication interfaces for transmitting and receiving data. The apparatus 210 can include one or more memories (not explicitly shown) configured to store information such as data and/or instructions. In some implementations, the processor electronics 220 can include at least a portion of transceiver electronics 230. In some embodiments, at least some of the disclosed techniques, modules or functions are implemented using the apparatus 210.

Figure 3:
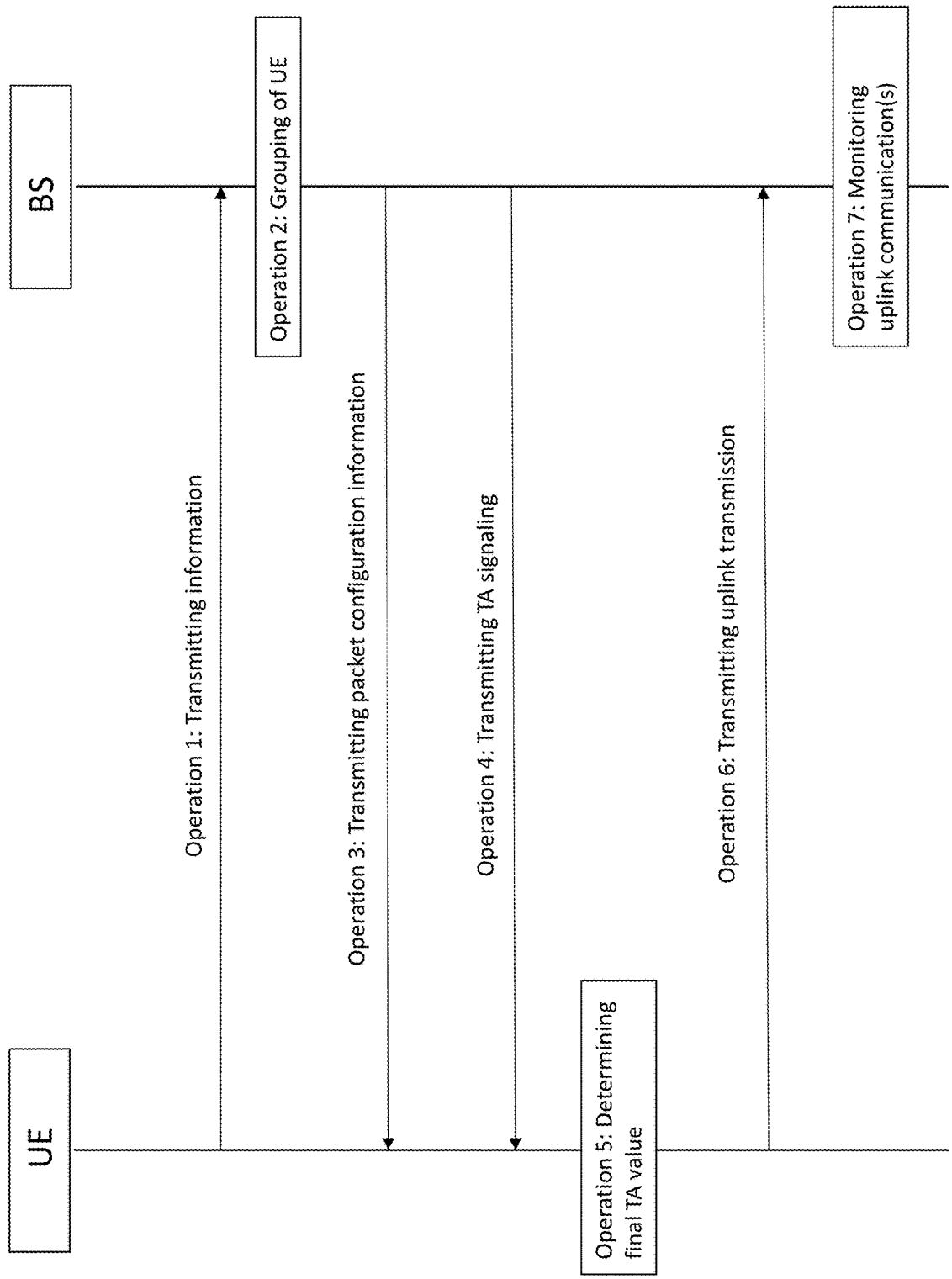
FIG. 3 shows an example of a TA adjustment scheme based on some implementations of the disclosed technology.

FIG. 3 shows an example of a TA adjustment scheme based on the implementations of the disclosed technology. Operations (1) to (7) are shown in FIG. 3 but all of the operations are not necessarily required to provide the suggested TA adjustment scheme and various implementations of the disclosed technology can be provided to include at least only some of operations (1) to (7) as shown in FIG. 3.

Operation (1): A user equipment (UE) transmits an information to a network side, for example, a base station (BS). In some implementations, the UE side performs capability reporting to report the capability information of the UE to the BS side. The capability information of the UE may include information related to at least one of positioning capability, positioning accuracy, UE calculation level, or a GPS capability (for example, whether the UE is aware of the star track/ephemeris information). In some implementations, the UE side provides UE related information without performing of the capability reporting. The examples of UE related information may include, but not limited to, the physical location of the UE, the serving beam of the UE, and others.

In some implementations, the performing of the capability information may include at least one of the following: i) The UE side reports to the BS side whether it has the autonomous TA adjustment capability. The autonomous TA adjustment capability means that the UE can determine the timing advance of the uplink signal transmission without the assistance of the BS; or ii) The UE side reports to the BS side whether it has the capability of receiving a group-based TA adjustment signaling. As will be explained below, the BS groups the UEs and can send a TA signaling based on the group. The capability of receiving the group-based TA adjustment signaling means that the UE can receive the TA signaling sent to the group to which the UE belongs.

Operation (2): The BS side performs initial grouping of the UE based on the capability information or the UE related information provided form the UE. Each group may include at least one UE. Depending on the information used for the initial grouping, the following two cases can be implemented:

Case 1: The UE is grouped based on the capability information provided from the UE side. In this case, the UEs with the autonomous TA adjustment capability may be grouped into one group which is defined as group-A, and the remaining UEs are divided into another group which is defined as group-B. In some implementations, the UEs in the group_B can be divided into subgroups, and each subgroup is assigned a unique sub-group-ID identifier. The basis of the division includes but is not limited to: the physical location of the UE or the serving beam of the UE.

Case 2: The base station groups the UE based on the geographical location reported from the UE. In this case, each group has a specific flag.

Case 3: The base station groups the UE based on a relay node where the UE is located. The relay node may be a layer 3 relay node (in-band half-duplex, out-of-band) or a layer 2 relay node. If the layer 3 relay node is used, the relay node is regarded by the UE as an independent BS. Then, the interaction process between the relay node and the UE includes Case 1 and Case 2. If a layer 2 relay node is used, the relay node is only used to transmit the PDSCH, and the scheduler exists in the BS. Then, the BS is still responsible for the UE control. Thus, the interaction process between the corresponding BS and the UE includes Case 1 and Case 2.

Operation (3): The BS side sends a packet configuration information to the UE side. The packet configuration information may include one of i) a group index of the user device indicating the group to which the UE belongs, ii) a validation duration or timer of a group configuration to which the UE belongs, iii) mapping relationship between the group index and TA adjustment parameters, or iv) identifications (IDs) of the UE in the group. To indicate the group of the UE, the group index can be directly provided to the UE or IDs of all the UEs in the group can be provided. The group configuration information may refer to information including but not limited to a group or a subgroup to which the UE belongs. The operation of the sending of the packet configuration information can include sending, by the BS side, an initial packet configuration information to the UE side if the UE is in an initial access, or sending, by the BS side, an updated packet configuration information to the UE side if the packet configuration information has been already provided to the UE.

Operation (4): The BS side transmits a TA signaling to the UE side based on the packet configuration information. For example, the TA signaling can contain at least one of i) a first TA adjustment parameter (TA_1), or ii) a second TA adjustment parameter (TA_2). The first TA adjustment parameter is shared by UEs in a same group. In this case, the TA signaling may include at least one of: a broadcasting signaling such as system information, a MAC, an RRC (Radio Resource Control) message, or a common DCI. In some implementations, the packet configuration information may be sent by the broadcasting signaling and/or the RRC message together with the packet message. The second TA adjustment parameter is UE specific. In this case, the TA signaling may include at least one of RRC, or MAC message such as MAC CE (MAC Control Element). For example, once the TA signaling(s) are transmitted via the broadcasting signaling, e.g., system information or common RRC configuration, these parameters may be shared by the corresponding group. Otherwise, the parameters will be dedicated to one UE if the parameter(s) is sent by UE specific signaling.

Which TA adjustment parameter(s) is to be sent to the UE side may be determined based on TA adjustment modes. In some implementations, there may exist three modes, i.e., Mode 1, Mode 2, Mode 3. In Mode 1, the BS side sends TA_1 and TA_2. In Mode 2, the BS side sends TA_1 only. In Mode 3, the BS side sends TA_2 only. The TA adjustment mode can be determined in various manners. For example, the TA adjustment mode can be determined based on the service type of the BS. Alternatively, the TA adjustment mode can be determined based on the UE type, capability of UE, or report of measurement including geographic position of UE, or others. As an example, if the BS is dedicated for IoT, e.g., NB-IoT, dedicated to the area, such as factory or farmland, the TA adjustment mode can be set as Mode 2 such that the BS side sends TA-1 shared by whole group of UEs since the TA for all UEs are similar. As another example, for either the scenarios with mixed UE types or large extension of coverage for BS, the TA adjustment mode can be set as Mode 1 such that the BS side sends both TA_1 and TA_2. As another example, the TA adjustment mode can be set as Mode 3 for an operation when large deviation on the TA can be foreseen to UE within the coverage of BS. In this case, the BS side sends TA_2 only.

The value of TA_1 can be absolute or relative value. The absolute value refers that TA value should be implemented in the transmission without any reference point (e.g., UL transmission reference). The relative value means that the deviation or finer adjustment of TA value is adopted in coming UL, comparing to the TA which is used in previous transmission. In some implementations, the TA value is absolute in the initial access of the network after starting up of the device. In this case, the BS may determine the absolute TA value based on the detection of preamble. In some other implementations, the TA value is relative. In this case, the BS may determine this value based on the reception of on-going UL signaling, including SRS (Sounding Reference Signal) or DMRS (Demodulation Reference Signal) for PUCCH (Physical Uplink Control Channel)/PUSCH (Physical Uplink Shared Channel). In some implementations, TA_2 may indicate the rate change of uplink synchronization error.

In some implementations, the BS side transmits N (N≥1) TA signaling(s). In some implementations, N (N≥1) TA signaling(s) can include L (L≥1) TA adjustment parameters. In this case, the one or more TA adjustment parameters include at least one of i) a first TA value shared with another device in the group, ii) a second TA value, iii) a group index, iv) mapping relationship between the group index and the one or more TA adjustment parameters, v) a TA variation rate, or vi) a validation duration or timer of the one or more TA adjustment parameters. With the group index of the UE alone or together with mapping relationship between the group index and TA adjustment parameters, the UE can understand which TA adjustment parameter is shared by the group to which the UE belongs. The TA variation rate can allow the UE to adjust or update the TA parameter automatically in consideration of corresponding granularity, e.g., a fraction of time or changes of position for either BS or UE. This granularity may correspond $\Delta t$ or $\Delta d$ which will be introduced in FIG. 4. In light of the granularity, the final TA value can be calculated by the UE as TA_final=Previous_TA+TA variation rate X granularity. Here, the granularity can be either signaled to the UE via same/different signaling to TA parameters or pre-defined value listed in the specification.

Figure 4:
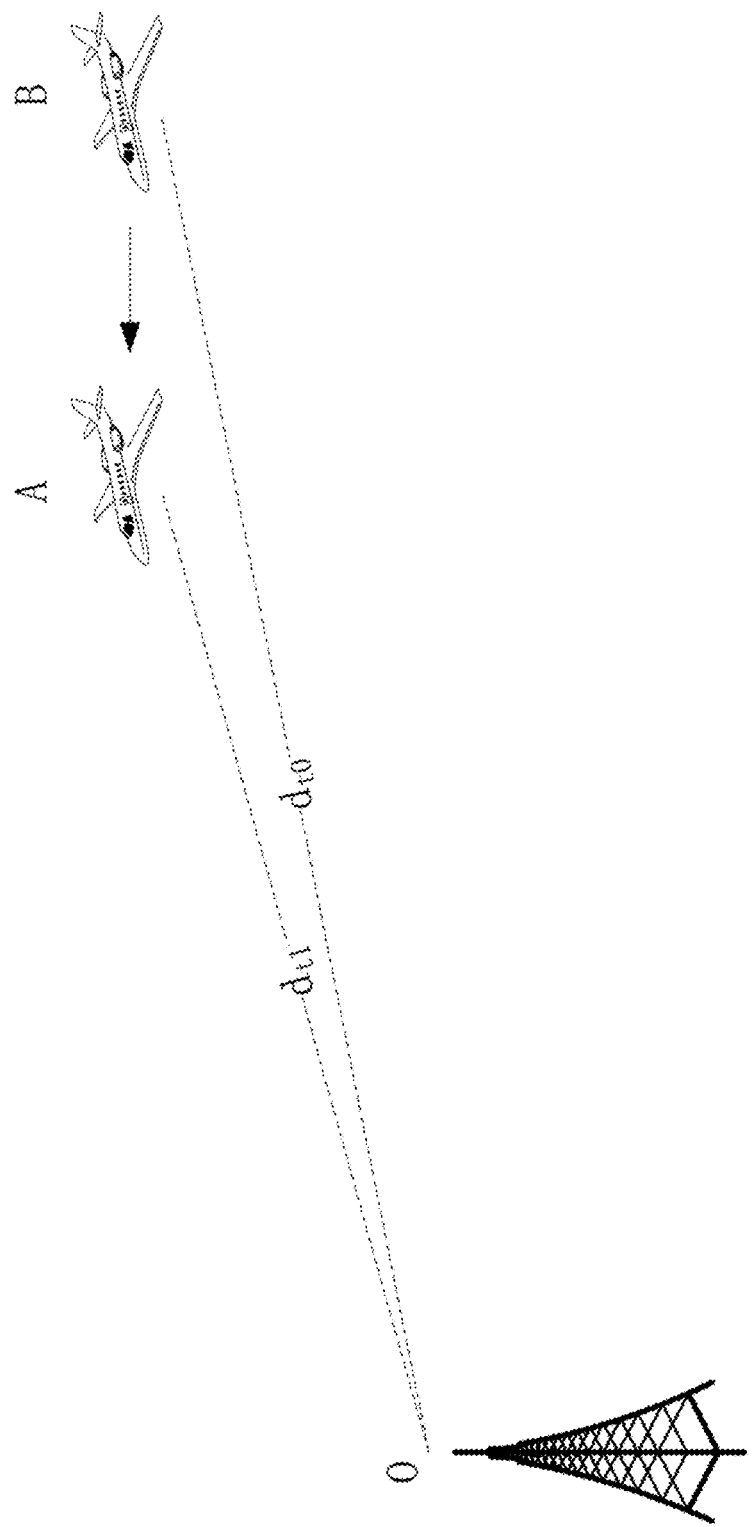
FIG. 4 shows a concept of a rate change of an uplink timing.

FIG. 4 shows a concept of a rate change of an uplink TA. The rate change of the uplink TA may be caused by the changes in the distance between the UE and the BS during a specified time interval. As shown in FIG. 4, the BS is located at the point 'O' having the three-dimensional coordinates (a, b, c), and at $t_0$, the UE is located at the point 'A' having the three-dimensional coordinates $(x_{r0}, y_{r0}, z_{r0})$ and at $t_1$, the UE is located at point B having the three-dimensional coordinates $(x_{r1}, y_{r1}, z_{r1})$, when $t_1$ is determined as $t_0+\Delta t$. In the time interval from to t $t_1$, the distance between the BS and the UE changes from $D_{r0}$ to $D_{r1}$. The change of the distance between the BS and the UE, $\Delta d$, is determined the equation:

$$\Delta d = d_{t_1} - d_{t_0} = \sqrt{(x_{t_1}-a)^2+(y_{t_1}-b)^2+(z_{t_1}-c)^2} - \sqrt{(x_{t_0}-a)^2+(y_{t_0}-b)^2+(z_{t_0}-c)^2}$$

This distance change causes the change of the uplink TA which may become the value of TA_2.

The operation of transmitting the TA signaling to the UE side can be implemented as follows: (i) If the UE belongs to the group-A and the uplink synchronization error of the UE reaches the threshold, the BS sends the TA signaling to the UE in a unicast manner. If the UE has the autonomous TA adjustment capability and the capability function is turned on, the timing of transmitting the TA signaling may be determined based on at least one of signal propagation delay, processing delay, or others, to avoid the conflicts of the UE's autonomous TA adjustments. (ii) If the UE belongs to the group-B and the relatively smaller number of uplink synchronization errors in the group-B reaches the threshold, the BS calculates a timing advance based on the related information of the UE, and transmits the TA signaling to the single UE in unicast and/or the broadcast form. (iii) If the UE belongs to the group-B and the relatively greater number of uplink synchronization errors in the group-B reaches the threshold, the BS calculates a timing advance based on the related information of all the UEs in the group-B, and transmits the TA signaling to all UEs in the group-B in the broadcast form.

Operation (5): If the UE side receives the TA signaling, the UE side determines the final TA value based on the received TA signaling sent from the BS side. In Mode 1, the UE side receives TA_1 and TA_2 and thus, the final TA value, TA_final becomes the sum of TA_1 and TA_2. In Mode 2, the UE side receives TA_1 only and thus, the TA_final becomes TA_1. In Mode 3, the UE side receives TA_2 only and thus, the TA_final becomes TA_2. In some implementations, the final TA value is determined based on at least one of TA_1 shared by the group, TA_2 specific to the UE, a TA variation rate, or a previous TA value. Based on the descriptions, the final TA value may be determined i) by one value, e.g., TA_1 shared by the group or TA_2 that is specific to the UE, or ii) by two values with one of following combinations, [TA_1 shared by the group, TA_2 that is specific to the user device], [TA_1 shared by the group, a TA variation rate], [TA_2 that is specific to the user device, a TA variation rate], or [a previous TA value, a TA variation rate]. In some implementations, the UE may obtain the previous TA value via reception of DL signaling from BS. In some other implementations, even without any signaling from the BS, the previous TA value can be recorded by the UE from the previous transmission.

Operation (6): After the UE determines the final TA adjustment parameter, the UE sends an uplink transmission including the final TA adjustment parameter to the BS side. If the UE belongs to group-A, the UE receives the TA adjustment signaling provided in unicast form. If the UE belongs to group-B, the UE simultaneously listens for TA adjustment signaling provided in unicast form and broadcast form.

Operation (7): The BS side monitors the uplink synchronization error of the UE and/or reports from the UE based on the uplink signal of the UE. Based on the monitoring, the BS side may update the packet configuration information to be sent to the UE side and/or the first/second TA parameters. In some implementations, for the UE in the group-A, the BS side monitors the working status of the UE's autonomous TA adjustment capability. If the uplink synchronization error rate or an uplink timing deviation is high enough and the UE may support the group-based TA adjustment, the BS may move the UE to a certain subgroup of the group-B and notify the UE to turn off the function of the autonomous TA adjustment capability. In some implementations, for the UE in the group-B, the BS side monitors the relevant measurement quantity of the UE and if the measurement quantity changes, the BS may change the subgroup of the UE. The change of the measurement quantity includes, but is not limited to, a change in the physical location of the UE, a change in the serving beam of the UE.

FIG. 5 shows an example of a TA adjustment scheme based on the implementations of the disclosed technology. The TA adjustment method as shown in FIG. 5 can be carried out by a network device. The network device transmits the TA signaling including one or more TA adjustment parameters to a user device. The transmitting of the TA signaling may correspond to the operation 4 of FIG. 3.

Figure 6:
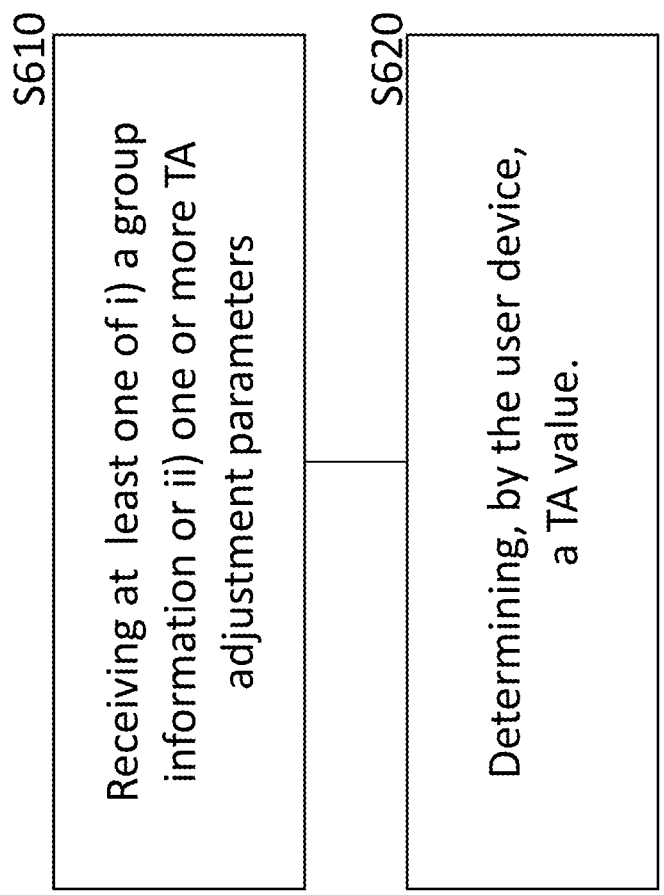
FIG. 6 shows another example of a TA adjustment scheme based on some implementations of the disclosed technology.

FIG. 6 shows an example of a TA adjustment scheme based on the implementations of the disclosed technology. The TA adjustment method as shown in FIG. 6 can be carried out by a user device. At 610, the user device receives i) a group information indicating a group assigned to the user device or ii) one or more TA adjustment parameters included in the TA signaling. The group information may be included in the packet configuration information transmitted from the network device at the operation 3 of FIG. 3. The one or more TA adjustment parameters may be included in the TA signaling transmitted from the network device at the operation 4 of FIG. 3. At 620, the network device determines a TA value based on the receiving, which may correspond to operation 5 of FIG. 3.

Figure 7:
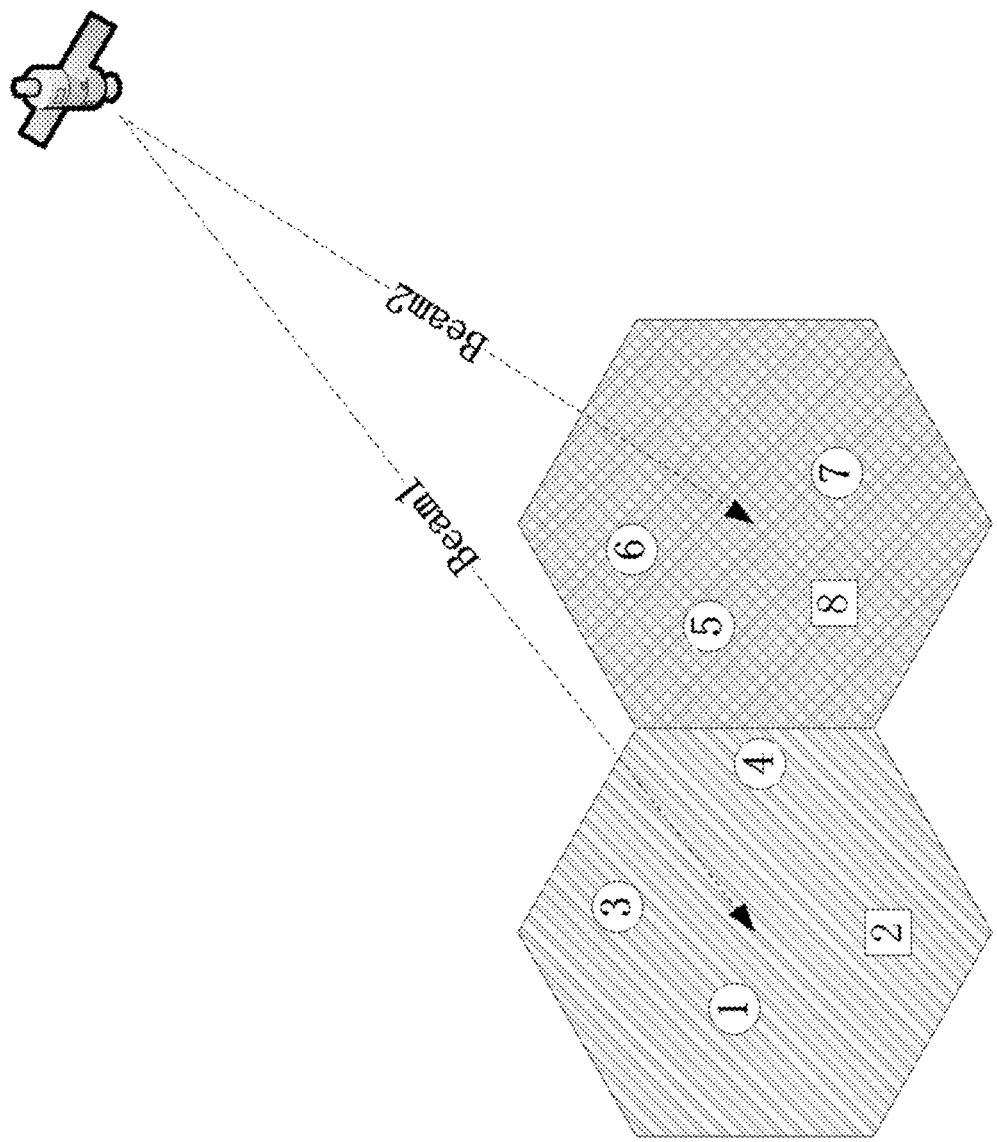
FIG. 7 shows an example of a satellite communication system in which an example of a TA adjustment scheme is applied based on some implementations of the disclosed technology.

FIG. 7 shows an example of a satellite communication system in which an example of a TA adjustment scheme is applied. FIG. 7 shows a low-orbit satellite communication system where the satellite acts as a BS node using multiple beams to cover the ground. For the convenience of description, only two beams are shown in the FIG. 7 and { UE1, UE2, UE3, UE4} are assigned to beam 1, and {UE5, UE6, UE7, UE8} are assigned to beam 2. The UE2 and the UE8 are equipped with GPS devices, and thus are aware of the location of the satellite at each moment, and the remaining UEs are ordinary UEs without GPS devices. All UEs support group-based TA adjustments.

On the BS side, the BS learns that the UE2 and the UE8 have the autonomous TA adjustment capability based on the capability information reported by the UE, and that all UEs support the group-based TA adjustment. The BS is informed by the measurement of the UE that {UE1, UE3, UE4} is in the coverage area of Beam1, and {UE5, UE6, UE7} are in the coverage area of Beam2. The BS groups the UE based on the UE capability and the serving beam of the UE, where {UE2, UE8} belongs to group-A, and the remaining UEs belong to group-B. Further, {UE1, UE3, UE4} belongs to sub-group1, and {UE5, UE7, UE8} belongs to sub-group2. The BS sends the group configuration information to the UE, and the configuration information includes the group index to which each UE belongs, and/or mapping information between the group index and TA adjustment parameters.

The BS monitors the change of the uplink synchronization error of the UE and assumes that the threshold of the synchronization error is $e_{threshold}$. The synchronization error refers to the timing offsets between the ideal instant and realistic instant for the reception of the UL signaling, which is calculated by the BS. For the UE in the group-A, when the synchronization error exceeds, the BS transmits the UE-specific TA signaling to the UE in a unicast manner. For each sub-group in the group-B, if UE uplink synchronization errors change for small number of the serving UE (e.g., less than 50%) are greater than $e_{threshold}$, the BS transmits the UE-specific TA signaling to the UEs in a unicast manner; otherwise, the BS broadcasts the group-based TA adjustment packet to all the UEs in the sub-group, and the UE-specific TA signaling is sent to one or more UEs in the sub-group in a unicast manner. For the UE in the group-A, if the BS detects that its autonomous TA adjustment result is not good, the BS moves the UE from the group-A to a certain subgroup of the group-B and notifies the UE to update the subsequent packet configuration information. For the UE in the group-B, if the BS detects that its serving beam has changed, the BS moves the UE from a certain subgroup of the group-B to another subgroup and notifies the UE to update the subsequent packet configuration information.

On the UE side, the UE reports its own capability information to the BS, and the capability information includes whether it has the autonomous TA adjustment capability and whether the UE supports the group-based TA adjustment. The BS sends the packet configuration information, for example, the information of the group or the subgroup to which the UE belongs. For the UE in the group-A, the UE receives the UE-specific TA signaling sent by the base station according to the received configuration information. For the UE in the group B, the UE receives the UE-specific TA signaling and the group-based TA signaling, which are sent by the base station according to the received configuration information. For the UE in the group-A, the UE receives the UE-specific TA signaling sent by the base station according to the received configuration information. If the TA signal received by the UE is the absolute value of the TA, the UE uses the absolute value as the TA value of the uplink signal transmission. If the TA signaling includes the relative value of the TA, the UE adds the relative value to the current TA value and uses the sum for the uplink signal transmission. If the TA signaling includes the rate of change of the uplink TA, $\mu$, assuming that the current time instant is t, and the timing advance at the previous time instant $t_0$ is $TA_0$, the amount of final for current time instant can be calculated as $TA_f = TA_0 + (t-t_0)*\mu$.

Additional features and embodiments the above-described methods/techniques discussed above are described below using a clause-based description format.

1. A wireless communication method including: transmitting, by a network device, to a user device, a timing advance (TA) signaling including one or more TA adjustment parameters, the one or more TA adjustment parameters determined depending on a group of the user device.

2. The wireless communication method of clause 1, further comprising receiving, by the network device, information from the user device, and wherein the information includes a capability information including whether the user device has an autonomous TA adjustment capability or whether the user device has a group-based TA adjustment capability, or a physical location or a serving beam of the user device.

3. The wireless communication method of clause 1, further comprising grouping the user device in the group based on the information, and wherein the grouping the user device includes grouping the user device based on whether the use device has an autonomous TA adjustment capability or based on geographical location of the user device.

4. The wireless communication method of clause 1, further comprising: transmitting, by the network device, to the user device, a packet group configuration information including at least one of i) a group index of the user device, ii) a validation duration or timer of a group configuration, iii) mapping relationship between the group index and the one or more TA adjustment parameters, or iv) identification (IDs) of the user device belong to each group 5. The wireless communication method of clause 1, wherein the one or more TA adjustment parameters include at least one of i) a first TA value shared with another device in the group, ii) a second TA value, iii) a group index, iv) mapping relationship between the group index and the one or more TA adjustment parameters, v) a TA variation rate, or vi) a validation duration or timer of the one or more TA adjustment parameters.

6. The wireless communication method of clause 5, wherein the first TA value is transmitted together with the group index by the TA signaling, or multiple TA parameters are transmitted by the TA signaling.

7. The wireless communication method of clause 1, wherein the TA signaling includes at least one of a system information, an RRC (Radio Resource Control) configuration, or MAC CE (MAC Control Element).

8. The wireless communication method of clause 1, wherein the transmitting the TA signaling includes: (i) transmitting the TA signaling to the user device in an unicast manner if the user device falls in a first group having an autonomous TA adjustment capability, (ii) transmitting the TA signaling to the user device only, if the user device falls in a second group having no autonomous TA adjustment capability and a smaller number of uplink errors reaches a threshold, or (iii) transmitting the TA signaling to the user device and an additional user device of the second group in the unicast manner, if the user device falls in the second group and a great number of uplink errors reaches the threshold.

9. The wireless communication method of clause 1, further comprising: updating the group of the user device based on i) monitoring of a communication from the user device, or ii) detecting of an uplink timing deviation of the user device in the group.

10. The wireless communication method of clause 1, wherein the updating the group of the user device includes at least one of i) moving the user device to another group, or ii) changing a subgroup of the user device in the group.

11. A wireless communication method including: receiving, by a user device, from a network device, at least one of i) a group information indicating a group assigned to the user device; or ii) one or more TA adjustment parameters included in a timing advance (TA) signaling; and determining, by the user device, a TA value for an uplink transmission based on the receiving.

12. The wireless communication method of clause 11, further comprising transmitting, by a user device, to a network device, an information, and wherein the information of the user device includes information related to at least one of a positioning capability, a positioning accuracy, a calculation level of the user device, a GPS transmit information, a geographical location of the user device, or a serving beam of the user device, an autonomous TA adjustment capability, or a group-based TA adjustment capability.

13. The wireless communication method of clause 11, wherein the TA value is determined based on at least one of a first TA adjustment parameter shared by the group, a second TA adjustment parameter that is specific to the user device, a TA variation rate, or a previous TA value.

14. The wireless communication method of clause 11, further comprising: performing, by the user device, a capability reporting including whether the user device has an autonomous TA adjustment capability or whether the user device has a group-based TA adjustment capability.

15. The wireless communication method of clause 11, wherein if the group information indicates the user device falls in a first group having an autonomous TA adjustment capability, the receiving step includes receiving the TA signaling sent in an unicast form and if the group information indicates the user device falls in a second group having no autonomous TA adjustment capability, the receiving step includes simultaneously receiving the TA signaling sent in the unicast form and a broadcast form.

16. A wireless communications apparatus comprising a processor and a memory, wherein the processor is configured to read code from the memory and implement a method recited in any of claims 1 to 15.

17. A computer program product comprising a computer-readable program medium code stored thereupon, the code, when executed by a processor, causing the processor to implement a method recited in any of claims 1 to 15.

It is intended that the specification, together with the drawings, be considered exemplary only, where exemplary means an example and, unless otherwise stated, does not imply an ideal or a preferred embodiment. As used herein, the use of "or" is intended to include "and/or", unless the context clearly indicates otherwise.

Some of the embodiments described herein are described in the general context of methods or processes, which may be implemented in one embodiment by a computer program product, embodied in a computer-readable medium, including computer-executable instructions, such as program code, executed by computers in networked environments. A computer-readable medium may include removable and non-removable storage devices including, but not limited to, Read Only Memory (ROM), Random Access Memory (RAM), compact discs (CDs), digital versatile discs (DVD), etc. Therefore, the computer-readable media can include a non-transitory storage media. Generally, program modules may include routines, programs, objects, components, data structures, etc. that perform particular tasks or implement particular abstract data types. Computer- or processor-executable instructions, associated data structures, and program modules represent examples of program code for executing steps of the methods disclosed herein. The particular sequence of such executable instructions or associated data structures represents examples of corresponding acts for implementing the functions described in such steps or processes.

Some of the disclosed embodiments can be implemented as devices or modules using hardware circuits, software, or combinations thereof. For example, a hardware circuit implementation can include discrete analog and/or digital components that are, for example, integrated as part of a printed circuit board. Alternatively, or additionally, the disclosed components or modules can be implemented as an Application Specific Integrated Circuit (ASIC) and/or as a Field Programmable Gate Array (FPGA) device. Some implementations may additionally or alternatively include a digital signal processor (DSP) that is a specialized microprocessor with an architecture optimized for the operational needs of digital signal processing associated with the disclosed functionalities of this application. Similarly, the various components or sub-components within each module may be implemented in software, hardware or firmware. The connectivity between the modules and/or components within the modules may be provided using any one of the connectivity methods and media that is known in the art, including, but not limited to, communications over the Internet, wired, or wireless networks using the appropriate protocols.

While this document contains many specifics, these should not be construed as limitations on the scope of an invention that is claimed or of what may be claimed, but rather as descriptions of features specific to particular embodiments. Certain features that are described in this document in the context of separate embodiments can also be implemented in combination in a single embodiment. Conversely, various features that are described in the context of a single embodiment can also be implemented in multiple embodiments separately or in any suitable sub-combination. Moreover, although features may be described above as acting in certain combinations and even initially claimed as such, one or more features from a claimed combination can in some cases be excised from the combination, and the claimed combination may be directed to a sub-combination or a variation of a sub-combination. Similarly, while operations are depicted in the drawings in a particular order, this should not be understood as requiring that such operations be performed in the particular order shown or in sequential order, or that all illustrated operations be performed, to achieve desirable results.

Only a few implementations and examples are described and other implementations, enhancements and variations can be made based on what is described and illustrated in this disclosure.

What is claimed is:

1. A wireless communication method including:
   transmitting, by a network device, to a user device, a timing advance (TA) signaling including one or more TA adjustment parameters that include i) a first TA value shared with another device in a group of the user device that is identified as one of multiple groups of user devices due to the user device having a capability to receive a group-based TA adjustment signaling, ii) a TA variation rate indicating a rate of a change of the first TA value, and iii) a validation duration of the one or more TA adjustment parameters,
   wherein the TA variation rate allows the user device to adjust the first TA value based on granularity that is a predefined value.

2. The wireless communication method of claim 1, wherein the one or more TA adjustment parameters are determined depending on the group of the user device.

3. The wireless communication method of claim 1, wherein the TA signaling is included in system information.

4. The wireless communication method of claim 1, wherein the TA signaling is included in an RRC (Radio Resource Control) configuration.

5. A wireless communication method including:
   receiving, by a user device, from a network device, one or more TA adjustment parameters included in a timing advance (TA) signaling; and
   determining, by the user device, a TA value for an uplink transmission based on the receiving,
   wherein the one or more TA adjustment parameters include i) a first TA value shared with another device in a group of the user device that is identified as one of multiple groups of user devices due to the user device having a capability to receive a group-based TA adjustment signaling, ii) a TA variation rate indicating a rate of a change of the first TA value, and iii) a validation duration of the one or more TA adjustment parameters,
   wherein the TA variation rate allows the user device to adjust the first TA value based on granularity that is a predefined value.

6. The wireless communication method of claim 5, wherein the one or more TA adjustment parameters are determined depending on the group of the user device.

7. The wireless communication method of claim 5, wherein the TA signaling is included in a system information configuration.

8. The wireless communication method of claim 5, wherein the TA signaling is included in an RRC (Radio Resource Control) configuration.

9. A wireless communications apparatus comprising at least one processor and a memory, wherein the at least one processor is configured to read code from the memory and cause the wireless communication apparatus to implement a method comprising:
   transmitting, by a network device, to a user device, a timing advance (TA) signaling including one or more TA adjustment parameters that include a first TA value shared with another device in a group of the user device that is identified as one of multiple groups of user devices due to the user device having a capability to receive a group-based TA adjustment signaling, ii) a TA variation rate indicating a rate of a change of the first TA value, and iii) a validation duration of the one or more TA adjustment parameters,
   wherein the TA variation rate allows the user device to adjust the first TA value based on granularity that is a predefined value.

10. The wireless communications apparatus of claim 9, wherein the one or more TA adjustment parameters are determined depending on the group of the user device.

11. The wireless communications apparatus of claim 9, wherein the TA signaling is included in system information.

12. The wireless communication apparatus of claim 9, wherein the TA signaling is included in an RRC (Radio Resource Control) configuration.

13. A user device, comprising one or more processors configured to cause the user device to implement a method comprising:
- receiving, from a network device, one or more TA adjustment parameters included in a timing advance (TA) signaling; and
- determining a TA value for an uplink transmission based on the receiving,
- wherein the one or more TA adjustment parameters include i) a first TA value shared with another device in a group of the user device that is identified as one of multiple groups of user devices due to the user device having a capability to receive a group-based TA adjustment signaling, ii) a TA variation rate indicating a rate of a change of the first TA value, and iii) a validation duration of the one or more TA adjustment parameters,
- wherein the TA variation rate allows the user device to adjust the first TA value based on granularity that is a predefined value.

14. The user device of claim 13, wherein the one or more TA adjustment parameters are determined depending on the group of the user device.

15. The user device of claim 13, wherein the TA signaling is included in system information.

16. The user device of claim 13, wherein the TA signaling is included in an RRC (Radio Resource Control) configuration.

* * * * *